UNITED STATES PATENT OFFICE.

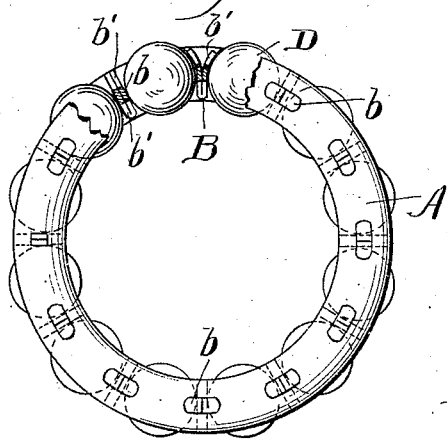
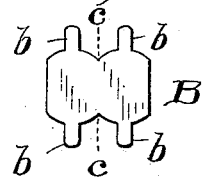
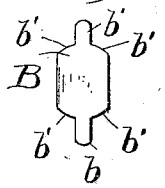
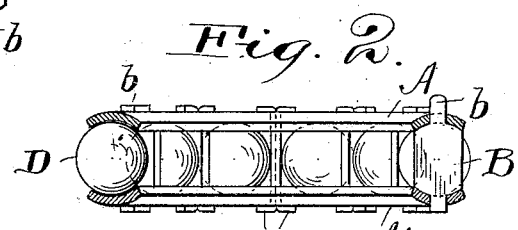
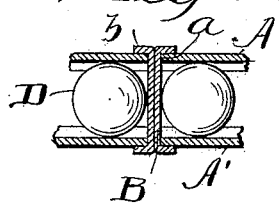
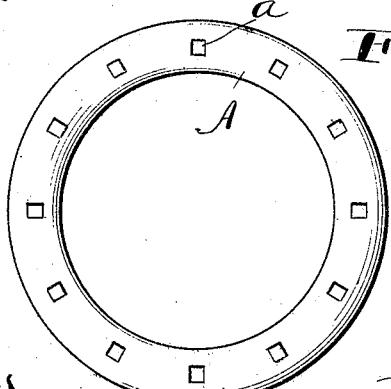

FRANK H. FARMER, OF CLEVELAND, OHIO, ASSIGNOR TO THE WHITE COMPANY, OF CLEVELAND, OHIO, A CORPORATION OF OHIO.

BALL-RETAINER.

997,979.  Specification of Letters Patent.  Patented July 18, 1911.

Application filed December 11, 1908. Serial No. 466,95'

*To all whom it may concern:*

Be it known that I, FRANK H. FARMER, a citizen of the United States, residing at Cleveland, in the county of Cuyahoga and State of Ohio, have invented a certain new and useful Improvement in Ball-Retainers, of which the following is a full, clear, and exact description.

Ball retainers generically like those shown, described and claimed herein, find their greatest field of usefulness in association with ball raceways into which the balls must be placed one at a time. It is therefore necessary that these ball retainers be assembled in proper relation to the balls while the balls are in these raceways.

The primary object of this invention is to provide a ball retainer having its parts so constructed that they may be easily assembled under the conditions stated, and may also be disassembled without destroying them or any of their parts.

The invention is illustrated in the accompanying drawings in which:

Figure 1 is a side view of a completed retainer with the balls in place; one of the retainer rings being partly broken away and the separator tongues sectioned where said ring is broken away. Fig. 2 is a transverse sectional view of said retainer. Fig. 3 is a side view of one of the retainer rings. Fig. 4 is a sectional view through the retainer rings and one of the separators. Fig. 5 is a plan view of a separator blank in what is regarded as its best form and Fig. 6 is a view of a separator formed of said blanks and ready to be connected with the rings.

The retainer includes two rings A and A' which, in the best construction, are concavo-convex in transverse section. Each ring has through it as many holes *a* as are required. B indicates the separators. Each has a body part intended to occupy a position between two adjacent balls D; and at each end of said body portion are two projecting tongues *b* of less width than the body part of the separator; wherefore the ends of the body part form shoulders *b'* which are of convex form and fit the inner surfaces of the two rings A, A'.

The two rings and the separators are assembled around the balls as shown, the tongues *b* projecting through the holes *a* of the rings. The two tongues at each end of the separator are then turned over in opposite direction against the outer faces of the rings thereby forcing said rings against the shoulders *b'* and holding all the parts in the described and shown relation to each other.

Preferably each retainer is made of a blank substantially as shown in Fig. 5; wherefore, if this blank be bent along the line *c*, it will make a separator of double thickness of substantially the shape shown in Fig. 6. This is a very satisfactory way of producing a separator of the required strength, provided with the two oppositely bendable tongues at each end.

The two folds of the separators may lie flat against each other, or they may be bent away from each other, both of which constructions are shown in Fig. 1.

Having thus described my invention, I claim:

1. In a ball retainer, the combination of two rings each concavo-convex in transverse section, and each having a plurality of holes, said rings being arranged with their concave sides facing each other, with a plurality of separators which lie between said rings and have tongues which project through holes in said rings and are turned over against the convex outer faces thereof, said separators also having, adjacent to said tongues, convex ends which engage with and fit the concave inner surfaces of said rings.

2. In a ball retainer, the combination of two concave rings provided with a plurality of holes, the rings having concave sides facing each other, a plurality of separators between the rings, each separator comprising a metal plate bent back upon itself, the end of each fold being formed convex to engage with the concave surface of the rings, and each fold also being provided with two tongues projecting from opposite ends thereof, the said tongues being adapted to pass through the holes in the rings and turn against the outer faces of the rings.

In testimony whereof, I hereunto affix my signature in the presence of two witnesses.

FRANK H. FARMER.

Witnesses:
H. R. SULLIVAN,
E. L. THURSTON.